United States Patent [19]

Hose

[11] 4,085,440
[45] Apr. 18, 1978

[54] INERTIAL NAVIGATION SYSTEM

[75] Inventor: Eddy Hose, Del Mar, Calif.

[73] Assignee: The United States of America as represented by the Secretary of the Army, Washington, D.C.

[21] Appl. No.: 794,195

[22] Filed: May 5, 1977

[51] Int. Cl.$^2$ .......................... G06G 7/78; B64G 1/20
[52] U.S. Cl. ................................. 364/454; 73/178 R; 364/434; 364/571
[58] Field of Search .................. 235/150.2, 24, 25, 27, 235/271; 73/178, 382

[56] References Cited

U.S. PATENT DOCUMENTS

| | | | |
|---|---|---|---|
| 2,634,610 | 12/1949 | Silverman | 73/382 |
| 3,545,266 | 12/1970 | Wilson | 235/150.25 |
| 3,633,003 | 1/1972 | Talwani | 235/150.25 |
| 3,699,316 | 10/1972 | Lopes, Jr. | 235/150.25 |
| 3,790,766 | 2/1974 | Brown | 235/150.25 |
| 3,829,659 | 8/1974 | Margolis | 235/150.25 |
| 3,984,072 | 10/1976 | Von Pragenau et al. | 235/150.25 |

OTHER PUBLICATIONS

Kreitzburg, Jr.; Compensating Gyro Drifts Control Engineering, Nov. 1963, pp. 113–116.
Fernandez, et al., Inertial Guidance Engineering Textbook, Prentice Hall, 1962, pp. 90–97.

Primary Examiner—Felix D. Gruber
Attorney, Agent, or Firm—Thomas O. Maser

[57] ABSTRACT

A navigational system for automatically positioning a platform relative to the earth's geopotential surface. A system is provided which includes an accurate self-contained attitude reference to the true vertical. The system includes an inertial platform which is rotatable relative to a level platform, each of the platforms being connected to a two axis gimbal. One of the platforms is also connected to a three axis gimbal which may be connected to the vehicle which it is desired to stabilize. Means are provided for sensing rotation of one platform relative to the other. An inertial platform position control computer is provided for generating first corrected signals to the three axis gimbal for automatically referencing the inertial platform to a datum reference spheroid. Additional computer means are provided for generating second corrected signals to the two axis gimbal to align the level platform with the true vertical to the geopotential surface of the earth.

10 Claims, 2 Drawing Figures

INERTIAL NAVIGATION SYSTEM

The invention described herein may be manufactured, used, and licensed by or for the Government for Governmental purposes without the payment to me of any royalties thereon.

BACKGROUND OF THE INVENTION

The invention is directed to a navigational system for automatically positioning a platform relative to the earth's geopotential surface. Such a navigational system has many applications in controlling the orientation of an object such as, for example, an aircraft or satellite or other vehicle. For example, in satellite control, it is important that an orbiting satellite include an attitude stabilization system which is oriented relative to the earth. Although efforts have been made to provide such stabilization systems, this invention provides improved means to effect accurate attitudinal reference with respect to what is referred to herein as the "true vertical." By "true vertical" is meant the perpendicular to the geopotential surface of the earth. Such an accurate attitudinal reference is required in order to properly align and/or stabilize at least one axis of the satellite relative to the earth.

The invention described herein also finds use in those navigational systems wherein accelerometers are used to effect leveling of a platform relative to one or more axis. In such systems it is necessary to ascertain the orientation of each accelerometer relative to the true vertical. This requirement is obviously important in the positioning of the accelerometer relative to, or the correction of the output signals which it generates as a function of, the true vertical. In those instances where the accelerometer is not truly vertical, its lack of proper orientation causes undesirable oscillations in the Schuler tuner loops ordinarily utilized in such systems, thereby causing navigational errors. Prior efforts to reduce the magnitude of such oscillations include the use of well known doppler radar units. However, such units are not always effective, and particularly in applications requiring a self-contained non-transmitting system the doppler radar aided mechanization is undesirable. To overcome the shortcomings of the doppler radar units, the present invention provides an accurate self-contained attitudinal reference to true vertical and may be used for damping an inertial navigation system.

Some prior art positioning systems utilizing accelerometer data to position a moving platform relative to the localized vertical are effective in correcting translational errors caused by movement. However, such systems do not correct for non-alignment of the platform caused by gravitational anomalies and deflections of the vertical which result therefrom. Such gravitational anomalies are inherent as a result of the inhomogenuity of the mass of the earth. Similar systems have relied upon geomagnetic data in addition to accelerometer data as positioning means. However, such systems require use in those environments where geomagnetic anomalies are not important since it is clear that geomagnetic anomalies are often at least as detrimental, if not more so, than gravitational anomalies.

Accordingly, it is an object of this invention to provide a navigational system which references a platform to the earth as desired by correcting (a) errors caused by motion of the platform, and (b) errors caused by gravitational anomalies caused by the inhomogenuity of the earth's surface, and the resulting deflections of the vertical.

Another object of this invention is to provide a navigational system having a gimballed platform to which may be mounted any navigation instrument.

Still another object of this invention is to provide a navigational system which is not subject to the problem of geomagnetic anomalies.

A further object of this invention is to provide a navigational system which is not subject to the problem of gravitational anomalies.

Still a further object of this invention is to provide a gravity gradient level which automatically provides accurate and dynamic alignment of a platform relative to the geopotential surface of the earth irregardless of curvature variations in the geopotential along the path of travel of the platform.

Yet another object of this invention is to provide a navigational system which is capable of self-levelling in free flight and operates effectively in orbit.

Another object of this invention is to provide a navigational system which effects accurate attitudinal reference with respect to the true vertical.

A further object of this invention is to provide a navigational system wherein an inertial platform can be automatically rotated into a datum reference spheroid.

Another object of this invention is to provide a navigational system wherein a level platform is aligned with the true vertical to the geopotential surface of the earth.

SUMMARY OF THE INVENTION

This invention achieves these and other objects by providing an inertial navigation system which provides an accurate self-contained attitude reference to the true vertical. The system comprises a platform assembly which includes an inertial platform unit comprising an inertial platform and a level platform unit comprising a level platform. The platforms are rotatably connected to a two axis gimbal. Means are provided for sensing rotation of one platform relative to the other. A three axis gimbal is connected to the platform assembly and performs two functions. First, the three axis gimbal provides a means for connecting the platform assembly to the vehicle which it is desired to stabilize as described herein. Second, the three axis gimbal provides a means for automatically referencing the inertial platform to a datum reference spheroid such as, for example, that spheroid which is most descriptive of the mean sea level geoid. Such referencing is accomplished by providing a control means for generating first output signals to the inertial platform unit which generates first positioning signals in response thereto. Such first positioning signals are coupled to an inertial platform position control computer which generates first corrected signals in response thereto to the three axis gimbal. The control means receives second positioning signals from the level platform unit, second output signals from the sensing means, and third output signals from the inertial platform unit. The control means eliminates any errors it senses in the second positioning signals and second and third output signals, and generates second corrected signals to the two axis gimbal to align the level platform with the true vertical to the geopotential surface of the earth.

DESCRIPTION OF DRAWINGS

This invention may be clearly understood by reference to the attached drawings in which.

DESCRIPTION OF PREFERRED EMBODIMENT

Figure 1:
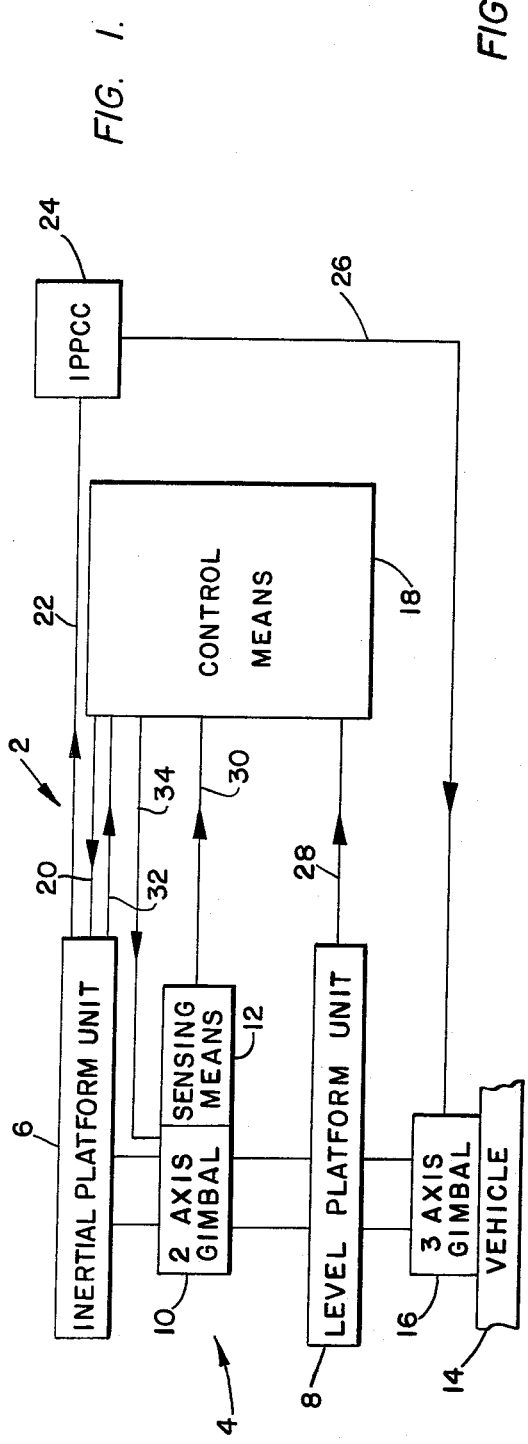
FIG. 1 is a block diagram of the navigational system.

The embodiment of this invention which is schematically illustrated in block diagram form in FIG. 1 is one which is particularly suited for achieving the objects of this invention. FIG. 1 depicts the navigational system 2 of the present invention. Navigational system 2 comprises a platform assembly 4 including an inertial platform unit 6, which includes an inertial platform, and a level platform unit 8, which includes a level platform. The level and inertial platforms are coupled together by a two axis gimbal 10 such that the inertial platform is rotatable relative to the level platform. Means 12 are provided for sensing the rotation of the inertial platform relative to the level platform. As shown in FIG. 1, the object to be stabilized, which in this instance is vehicle 14, is connected to the platform assembly 4 by means of a three axis gimbal 16. In the drawings the connection to platform assembly 4 is between the level platform and three axis gimbal 16. However, it is not meant to so limit the present invention, and the relative positions of the level and inertial platforms may be interchanged if desired so that the connection to platform assembly 4 is between the inertial platform and three axis gimbal 16.

Control means 18 is provided for generating first output signals which are fed through line 20 to the inertial platform unit 6 which generates first positioning signals in response thereto which are fed through line 22. An inertial platform position control unit 24 is provided for receiving the first positioning signals being fed through line 22 and generating first corrected signals in response thereto which are fed through line 26 and coupled to the three axis gimbal 16 thereby causing the inertial platform to be referenced to a datum reference spheroid. Control means 18 also receives second positioning signals which are fed through line 28 from level platform unit 8, second output signals which are fed through line 30 from sensing means 12, and third output signals which are fed through line 32 from inertial platform unit 6, and generates second corrected signals, in response thereto, which are fed through line 34 to the two axis gimbal 10 to align the level platform with the true vertical to the geopotential surface of the earth.

Figure 2:
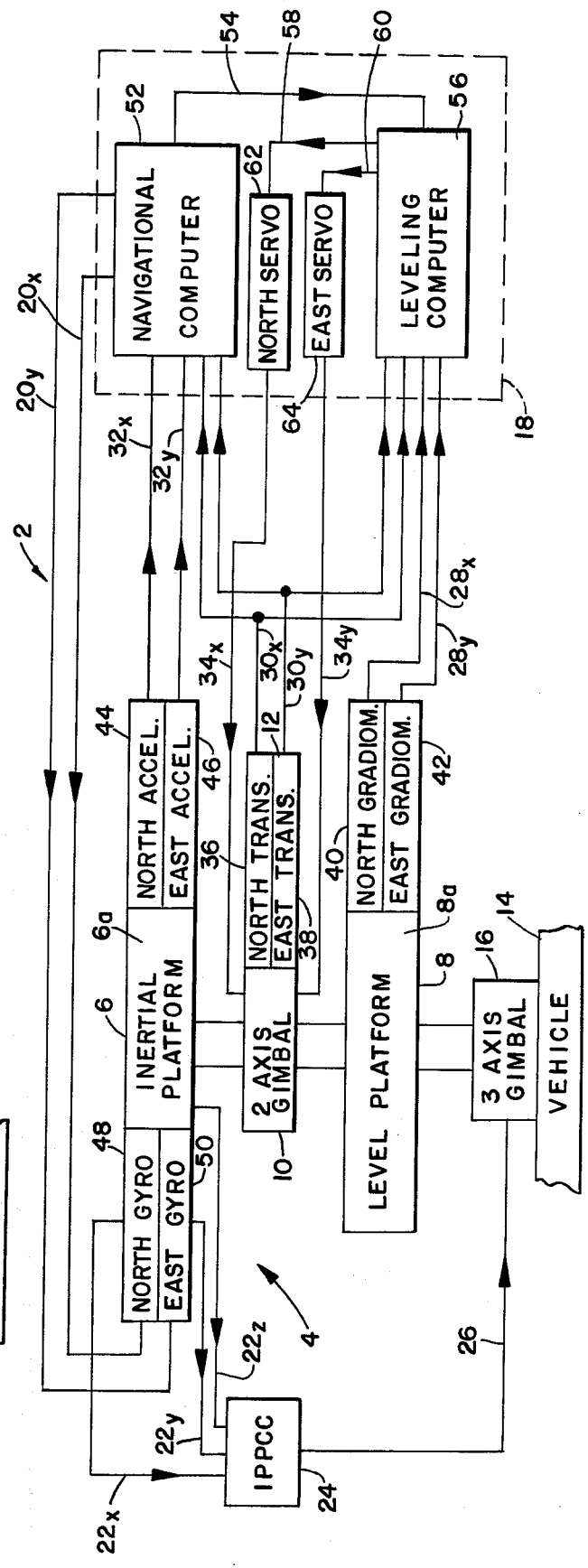
FIG. 2 is a block diagram of the preferred embodiment of the navigational system.

In the preferred embodiment depicted in FIG. 2, the two axis gimbal 10 has coupled thereto a sensing means 12 comprising two transducers which sense the rotation of inertial platform 6a relative to level platform 8a and produce signals corresponding to such rotation. For example, in the drawings there is depicted a "north" transducer 36 and an "east" transducer 38 for sensing the level error in the north and east directions, respectively, and for generating the second output signals referred to herein corresponding to such sensed error. Said second output signals are designated, respectively, north transducer signals $B_x$, which represent the level error in the north direction, and east transducer signals $B_y$, which represent the level error in the east direction. The subscripts $x$ and $y$ are used herein to represent the north and east axes, respectively. Transducer signals $B_x$ and $B_y$ are fed through lines $30_x$ and $30_y$, respectively.

In this embodiment it is also preferred to provide a level platform 8a having mounted thereon an orthogonal vertical north rotating gravity gradiometer 40 and an orthogonal vertical east rotating gravity gradiometer 42 which are aligned with the platform's north and east axes, respectively. One example of such a gradiometer is described in Bell, U.S. Pat. No. 3,564,921. Gradiometers 40 and 42 operate in the vertical plane to measure the vertical gradient of gravity in addition to the direction of the vertical in the plane of the astronomical azimuth "a," and generate signals corresponding thereto. In this instance, for example, north gradiometer 40 and east gradiometer 42 produce said second positioning signals which are designated, respectively, north gradiometer positioning signals and east gradiometer positioning signals and which are fed through lines $28_x$ and $28_y$, respectively. Such signals are produced as output signals in the inphase (I) and quadrature (Q) format.

Preferably, inertial platform 6a has mounted thereon an orthogonally oriented "north" accelerometer 44 and an orthogonally oriented "east" accelerometer 46 which are aligned with the platform's north and east axes, respectively, so that they respond to accelerations in the north and east directions, respectively. The accelerometers generate said third output signals which are designated, respectively, north acceleration signals $a'_x$ and east acceleration signals $a'_y$, which correspond to acceleration errors in the north and east directions, respectively. Acceleration signals $a'_x$ and $a'_y$ are fed through lines $32_x$ and $32_y$, respectively.

The inertial platform 6A also preferably has mounted thereon orthogonally mounted north gyroscope 48 and orthogonally mounted east gyroscope 50 which are aligned with the platform's north and east axis, respectively.

Gyroscopes 48 and 50 are controlled by two Schuler tuned inertial navigation loops implemented in control means 18 as a function of (a) the rate of change along the direction of the astronomical north, designated herein $\dot{a}_n$; (b) the rate of change of the geodetic latitude, designated $\dot{\phi}$; (c) the components of the earth's rotation or rotational vector of the earth with respect to inertial space in the geodetic coordinate systems, designated herein $\Omega_x$, $\Omega_y$, and $\Omega_z$; and, (d) the rate of change of the geodetic longitude, designated herein $\dot{\lambda}$. Such loops produce said first output signals which are fed to gyroscopes 48 and 50 through lines $20_x$ and $20_y$, respectively. Gyroscopes 48 and 50 resolve output signals 20 into north positioning signals and east positioning signals, respectively, which signals are fed through lines $22_x$ and $22_y$, respectively, which signals are fed through lines $22_x$ and $22_y$, respectively. A further positioning signal is generated by inertial platform 6 and fed through line $22_z$.

The positioning signals fed through lines $22_x$, $22_y$ and $22_z$ are coupled to the inertial platform position control computer 24 which eliminates any errors and resolves such positioning signals into first corrected signals which are fed through line 26 to control the three-axis gimbal unit 16 so that the attitude of the inertial platform is referenced to a datum reference spheroid.

Control means 18 is depicted as comprising a navigational computer 52. In the preferred embodiment said two Schuler tuned inertial navigation loops are implemented in navigational computer 52. In addition, north and east acceleration signals $a'_x$ and $a'_y$, which are fed through lines $32_x$ and $32_y$, respectively, and north and east transducer signals $B_x$ and $B_y$, which are fed through lines $30_x$ and $30_y$, respectively, are coupled to navigational computer 52. Navigational computer 52 corrects such acceleration signals as a function of the angle B between the true vertical and the orientation of the inertial platform, to provide corrected acceleration signals $a_x$ and $a_y$, in accordance with the following set of equations:

$$a_x = a'_x - B_x g$$

$$a_Y = a'_y - B_y g$$

As noted above, signals $B_x$ and $B_y$ are applied from transducers 36 and 38. The corrected signals $a'_x$ and $a'_y$ are used in navigational computer 52 in the navigation computations and fed through line 54 to leveling computer 56 of which control means 18 is also comprised. Transducer signals $B_x$ and $B_y$ fed through lines $30_x$ and $30_y$, respectively, and gradiometer signals fed through lines $28_x$ and $28_y$ are also coupled to leveling computer 56. Leveling computer 56 converts said second positioning signals into the $A_N$, $\theta_N$ and $A_E$, $\theta_E$ format wherein the signal A is proportional to the value of the gravity gradient and the signal $\theta$ is proportional to the deviation from the apparent vertical ($\vec{a}g'$) in the plane of "a." The leveling computer 56 accomplishes this conversion by converting the inphase ($I_N$, $I_E$) and quadrature ($Q_N$, $Q_E$) signals from each of the gradiometers to amplitude ($A_N$, $A_E$) and phase angle ($\theta_N$, $\theta_E$) signals in accordance with the following general equations:

$$A = |(I^2 + Q^2)^{\frac{1}{2}}|$$

$$\theta = \mathrm{Tan}^{-1} \frac{Q}{I}$$

of course, the subscripts N and E refer to north and east, respectively. Leveling computer 56 further processes all of the signals applied thereto to provide drive signals $\theta_N - \theta_{RN}$ and $\theta_E - \theta_{RE}$, which are fed through lines 58 and 60, respectively. The signals $\theta_{RE}$ and $\theta_{RN}$ are calculated from navigational data and are used to compensate for the Eötvös effect caused by the rotation of level platform 8a. In this manner, the signals $\theta_E - \theta_{RE}$ and $\theta_N - \theta_{RN}$ are produced when computer 56 solves the following equations:

$$\theta_{RE} = \mathrm{Sin}^{-1} \frac{k T_{RQE}}{A_E}$$

$$\theta_{RN} = \mathrm{Sin}^{-1} \frac{k T_{RQN}}{A_N}$$

where $$T_{RQE} = (\Omega_y W_z + \Omega_z W_y - \frac{1}{2} W_y W_z)$$

$$T_{RQN} = (\Omega_x W_z + \Omega_z W_x - \frac{1}{2} W_x W_z)$$

$k$ = a scale factor constant $$W_z = a_n$$
$$\dot{W}_x = \dot{\phi} + \dot{B}_x$$
$$w_y = \dot{\lambda} + \dot{B}_y$$
$$\Omega_z = \Omega \sin \phi$$
$$\Omega_x = \Omega \cos \phi$$
$$\Omega_y = 0$$
$$\dot{B}_x = \frac{dB_x}{dt}$$

$$\dot{B}_y = \frac{dB_y}{dt}$$

$\cdot$ = a symbol for a total time derivative, i.e., equivalent to $\frac{d}{dt}$ The drive signals fed through lines 58 and 60 are proportional to the derivation from the true vertical and are used to control north servomechanism 62 and east servomechanism 64, respectively, each of which are generally commercially available. Such servos generate corrected signals. For example, the east and north servos further resolve the drive signals into said second corrected signals which are fed through lines $34_x$ and $34_y$, respectively, so that level platform 8a is maintained perpendicular to the true vertical.

The embodiments which have been described herein are but some of several which utilize this invention and are set forth here by way of illustration but not of limitation. It is apparent that many other embodiments which will readily apparent to those skilled in the art may be made without departing materially from the spirit and scope of this invention.

What is claimed is:

1. A navigational system comprising:
   a platform assembly comprising an inertial platform unit which includes an inertial platform, a level platform unit which comprises a level platform, said inertial platform and said level platform being connected to a two axis gimbal, said inertial platform being rotatable relative to said level platform, and means connected to said two axis gimbal for sensing said rotation,
   a three axis gimbal connected to said platform assembly for referencing said inertial platform in response to first corrected signals and for connecting said assembly to a vehicle,
   an inertial platform position control computer for generating said first corrected signals to said three axis gimbal, in response to first output signals generated from a control means to said inertial platform unit and first positioning signals received from said inertial platform unit, for referencing said inertial platform to a datum reference spheroid, and,
   a control means for generating said first output signals, and for generating second corrected signals to said two axis gimbal in response to second positioning signals received from said level platform unit, second output signals received from said sensing means, and third output signals received from said inertial platform unit, for aligning said level platform with the true vertical to the geopotential surface of the earth.

2. The system of claim 1 wherein said sensing means comprises a noth transducer and an east transducer for sensing the level error in the north and east directions, respectively, and for producing said second output signals, which comprise respective north and east transducer signals, corresponding to said sensed error, and emitting said signals to said control means.

3. The system of claim 2 wherein said level platform unit comprises an orthogonal vertical north rotating gravity gradiometer and an orthogonal vertical east rotating gravity gradiometer aligned with the north and east axes, respectively, said gradiometers producing said second positioning signals which comprise respective north gradiometer signals and east gradiometer signals, and emitting said signals to said control means.

4. The system of claim 3 wherein said inertial platform unit comprises an orthogonally oriented north accelerometer and an orthogonally oriented east accelerometer aligned with the north and east axes, respectively, said accelerometers producing said third output signals which comprise respective north and east acceleration signals, and emitting said signals to said control means.

5. The system of claim 4 wherein said inertial platform unit further comprises an orthogonally mounted north gyroscope and an orthogonally mounted east gyroscope, aligned with the north and east axes, respectively, and gyroscopes receiving said first output signals from said control means, resolving said first output signals into said first positioning signals which comprise north and east positioning signals, respectively, and emitting said north and east positioning signals to said inertial platform position control computer.

6. The system of claim 5 wherein said control means comprises:
a navigational computer for receiving said acceleration and transducer signals, resolving said acceleration and transducer signals into corrected acceleration signals, and emitting said corrected signals to a leveling computer, said leveling computer also receiving said transducer and second positioning signals, resolving said corrected acceleration, transducer and second positioning signals into drive signals, and
means for resolving said drive signals into said second corrected signals.

7. The system of claim 6 wherein said resolving means comprises north and east servomechanisms 8. The system of claim 7 wherein said three axis gimbal is connected to said level platform.

9. A navigational system comprising:
a platform assembly comprising an inertial platform and a level platform connected to a two axis gimbal, said inertial platform being rotatable relative to said level platform;
a three axis gimbal connected to said platform assembly;
north and east transducers connected to said two axis gimbal for sensing the level error in the north and east directions, respectively, and producing respective north and east transducer signals corresponding to said sensed error;
north and east orthogonal vertical rotating gravity gradiometers connected to said level platform and aligned with said platform's north and east axes, respectively, for producing respective north and east gradiometer signals;
north and east orthogonally oriented accelerometers connected to said inertial platform and aligned with said platform's north and east axes, respectively, for producing respective north and east acceleration signals;
a navigational computer for producing first output signals, and for receiving said acceleration and transducer signals, and resolving said acceleration and transducer signals into corrected acceleration signals;
north and east orthogonally mounted gyroscopes connected to said inertial platform and aligned with said platform's north and east axes, respectively, for receiving said first output signals from said navigational computer, and resolving said first output signals into respective north and east positioning signals;
a leveling computer for receiving corrected acceleration, transducer and gradiometer signals, and resolving said corrected acceleration, transducer and gradiometer signals into drive signals;
an inertial platform position control computer for receiving said north and east positioning signals, and further positioning signals produced by said inertial platform, resolving said positioning signals into first corrected signals, and emitting said first corrected signals to said three axis gimbal for referencing said inertial platform to a datum reference spheroid; and,
north and east servo mechanisms for receiving said drive signals, resolving said drive signals into second corrected signals and emitting said second corrected signals to said two axis gimbal for aligning said level platform with the true vertical to the geopotential surface of the earth.

10. The system of claim 9 wherein said three axis gimbal is connected to said level platform.

* * * * *